United States Patent [19]

Reed et al.

[11] Patent Number: 4,933,754

[45] Date of Patent: Jun. 12, 1990

[54] METHOD AND APPARATUS FOR PRODUCING MODIFIED PHOTOGRAPHIC PRINTS

[75] Inventors: William G. Reed, Seattle; Maxwell G. Maginness, Redmond, both of Wash.

[73] Assignee: Ciba-Geigy Corporation, Ardsley, N.Y.

[21] Appl. No.: 371,657

[22] Filed: Jun. 20, 1989

Related U.S. Application Data

[63] Continuation of Ser. No. 256,154, Oct. 7, 1988, abandoned, which is a continuation of Ser. No. 117,011, Nov. 3, 1987, abandoned.

[51] Int. Cl.$^5$ .............................................. G03B 27/72
[52] U.S. Cl. ...................................... 358/76; 358/80; 355/40; 355/328
[58] Field of Search ................. 358/80, 75, 280, 302, 358/296; 355/326, 327, 328, 245, 228, 40

[56] References Cited

U.S. PATENT DOCUMENTS

| | | |
|---|---|---|
| 3,115,807 | 12/1963 | Craig et al. . |
| 3,205,767 | 9/1965 | Weber et al. . |
| 3,351,707 | 11/1967 | Dreyfoos, Jr. et al. . |
| 3,761,172 | 9/1973 | Letzer . |
| 3,824,604 | 7/1974 | Stein ............................... 355/40 X |
| 3,912,391 | 10/1975 | Fleisher et al. . |
| 3,934,081 | 1/1976 | Schumacher . |
| 4,097,892 | 6/1978 | Balding . |
| 4,149,799 | 4/1979 | Pone, Jr. et al. . |
| 4,152,068 | 5/1979 | Bickl et al. . |
| 4,204,754 | 5/1980 | Asanuma et al. ................ 355/40 X |
| 4,239,385 | 12/1980 | Hujer ................................. 355/71 |
| 4,288,822 | 9/1981 | Hareng et al. .................... 358/296 |
| 4,340,905 | 7/1982 | Balding ............................ 358/80 |
| 4,351,608 | 9/1982 | Coote et al. . |
| 4,364,084 | 12/1982 | Akimoto et al. ................. 358/76 |
| 4,368,974 | 1/1983 | Coote et al. . |
| 4,378,567 | 3/1983 | Mir . |
| 4,378,568 | 3/1983 | Mir . |
| 4,392,719 | 7/1983 | Sekimato ......................... 350/342 |
| 4,431,288 | 2/1984 | Iwata et al. ...................... 354/446 |
| 4,435,077 | 3/1984 | Suzuki et al. .................... 355/7 X |
| 4,541,704 | 9/1985 | Freeman ........................... 354/432 |
| 4,549,223 | 10/1985 | Ozawa ............................. 358/300 |
| 4,564,853 | 1/1986 | Egan ................................. 346/160 |
| 4,580,167 | 4/1986 | Diete ................................ 358/302 X |
| 4,583,186 | 4/1986 | Davis et al. . |
| 4,680,644 | 7/1987 | Shirato et al. .................... 358/280 X |
| 4,715,690 | 12/1987 | Onodera et al. . |

FOREIGN PATENT DOCUMENTS

| | | |
|---|---|---|
| 0054848 | 12/1981 | European Pat. Off. . |
| 0146335 | 6/1985 | European Pat. Off. . |
| 0225410 | 6/1987 | European Pat. Off. . |
| 2603533 | 12/1976 | Fed. Rep. of Germany . |
| 2442125 | 5/1977 | Fed. Rep. of Germany . |
| 2551800 | 5/1977 | Fed. Rep. of Germany . |
| 2457877 | 9/1978 | Fed. Rep. of Germany . |
| 240819 | 9/1985 | Fed. Rep. of Germany . |
| 140804 | 3/1980 | German Democratic Rep. . |
| 1564339 | 4/1980 | United Kingdom . |
| 2136142 | 9/1984 | United Kingdom . |

OTHER PUBLICATIONS

Shinji et al., "18.4:4.25-In. and 1.51-In. B/W and Full Color LCD Video Displays Addressed by Poly-Si TFT's", 6-1984.

*Primary Examiner*—Howard W. Britton
*Assistant Examiner*—Mark R. Powell
*Attorney, Agent, or Firm*—Christensen, O'Connor, Johnson & Kindness

[57] ABSTRACT

A system for adjusting the density or contrast of a photographic print includes a projection lens system (18) for projecting an image from a negative (10) onto photosensitive paper (20). A matrix array (24) of liquid crystal display elements is interposed in the optical path in front of the print paper (20) and transmissivity of the individual LCD elements is controlled to provide an LCD mask to control the intensity and/or color of the light falling upon the print paper (20). Preferably, a television camera (16) is used with a beam splitter (14) to provide a real-time image of either the LCD mask (24) or the combined image of the mask (24) and negative (10) to allow adjustments in the mask (24) to be viewed as they are made. In printing black and white photos on multicontrast paper, the color transmissivity of the LCD elements is adjusted on an element-by-element basis to provide a localized adjustment of the contrast range of the print paper. Density and contrast can be simultaneously adjusted by controlling both the color balance and overall transmissivity of the LCD elements.

17 Claims, 4 Drawing Sheets

METHOD AND APPARATUS FOR PRODUCING MODIFIED PHOTOGRAPHIC PRINTS

This application is a continuation of copending application Ser. No. 256,154, filed on Oct. 7, 1988, now abandoned, which is a continuation of application Ser. No. 117,011, filed on Nov. 3, 1987, now abandoned.

BACKGROUND OF THE INVENTION

This invention relates to methods and apparatus for making photographic prints from negatives or from slides and, more particularly, relates to a method and apparatus for locally correcting the density and/or contrast of photographic negatives or slides prior to making the print to correct for localized areas of over- or underexposure in the negative or slide.

Oftentimes, when a photograph is taken, due to the conditions at the time the photograph is taken, there will be areas on the film negative produced after developing the film that are over- or underexposed relative to what can be reproduced on a photographic print. If the negative is printed using normal techniques, the photographic print will have areas where the image is either too light or too dark to be reasonably visible or aesthetically pleasing to the photographer. The overall density of the print can be corrected by changing the exposure time in printing the negative; however, this has a uniform effect over the entire print area with the result that, if the exposure time is decreased to "brighten" the print exposure from dark areas of the negative, it will result in an overexposure of the normal areas to the point where they are washed out. On the other hand, if there are overexposed areas on the negative, an increase in exposure time during printing to draw out the detail in these overexposed areas then can result in the normally exposed areas of the film producing print portions that are too dark to see otherwise visible detail.

It is known in the photographic industry to use techniques known as "dodging" or "burning" in which a density mask is built up using pieces of film or other material that are then held in the exposure path when the print is being made to adjust for the over- or underexposure of certain areas of the film. However, this technique is difficult to uniformly perform on a repeated basis because of the inherent inaccuracies in placing the density mask in the proper location each time the print is made and necessitates a greater amount of time to adjust from print to print. Also, the results of the process are not known until after the print is made and if the results are unsatisfactory, another attempt must be made in a trial-and-error method until the satisfactory result is obtained.

It is, therefore, an object of the present invention to provide a method and apparatus for producing a photographic print from a negative or slide in which areas of over- and underexposure can be locally corrected without the necessity for manually placing a density mask in particular areas of the optical path. It is a further object of this invention to provide a local density correction mask that can be adjusted on a localized-area basis prior to making the print with real-time control and observation of the result to avoid trial-and-error techniques in printing. Another object of the invention is to provide a locally variable color mask that can be used with variable-contrast paper to locally adjust the contrast of the resulting photographic prints.

SUMMARY OF THE INVENTION

In accordance with the above-stated objects, a photographic printing apparatus is provided that includes a television camera for viewing the image from a film negative. The camera is coupled to means for receiving the signal from the television camera, digitizing the image and storing it in a matrix array. The image is viewed on a monitor coupled to the digitizing means. The system includes a means for selectively controlling each element of the matrix array of the digitized image and further includes means for transmitting the modified image to a matrix of liquid crystal display (LCD) elements that is interposed between a lamp and a developed film negative. The elements of the LCD array are turned on or off according to the control signal to produce a density mask having localized correction areas. The image from the combination of the film negative and the LCD matrix is exposed onto a photosensitive paper to produce a photographic print.

In the preferred embodiment, the TV camera views an image directly from the film negative-LCD combination. The same image is simultaneously optically transmitted by means of a beam splitter to the photographic paper. A shutter is interposed between the beam splitter and the photographic paper so that the photosensitive paper is not exposed to the light image from the negative until the operator selectively opens the shutter. The digitized image in the digitizing means is altered and the altered signal sent back to the LCD matrix in a closed loop until a satisfactory image appears on the monitor indicating that the desired corrections have been made to the digitized image. At that time the operator can selectively open the shutter, allowing the image from the negative-LCD combination to be exposed onto the photosensitive paper, producing a photographic print corresponding to the altered digitized image on the monitor.

In one embodiment of the invention the LCD matrix comprises a selectively color-transmissive screen so that color correction, as well as density correction, can be accomplished. Also, when used with variable-contrast paper that is responsive to different wavelengths of light the local color correction can be used to locally vary the contrast in a resulting black and white print.

BRIEF DESCRIPTION OF THE DRAWINGS

The objects and advantages of the present invention will be better understood by those of ordinary skill in the art and others upon reading the ensuing specifications taken in conjunction with the appended drawings, wherein.

DETAILED DESCRIPTION OF THE PREFERRED EMBODIMENT

Figure 1:
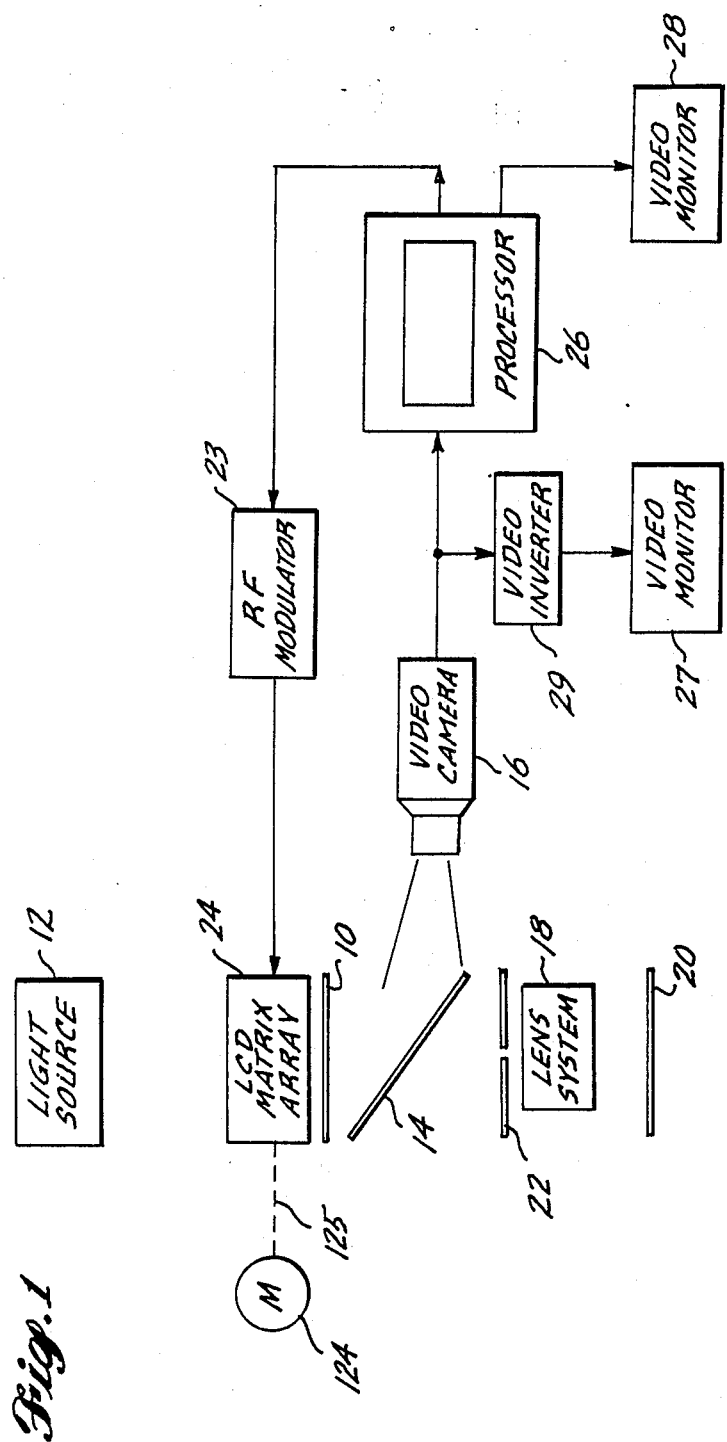
FIG. 1 is a block diagram of one embodiment of a photographic printer system using the closed-loop density and/or contrast correction apparatus of the present invention.

Referring to FIG. 1, a basic apparatus setup for carrying out the matrix density correction techniques of the present invention is shown in block diagram form. A film negative 10 is illuminated by a light source 12 and the image of the negative is cast upon a beam splitter 14. The beam splitter 14 reflects the image to a video camera 16 and also passes the image to a lens system 18. The lens system 18 focuses the image on a photosensitive paper 20 to produce a photographic print. A shutter 22 is placed in the optical path between the negative 10 and the paper 20 to control the exposure of the negative image onto the paper. In order to modify the image projected by the negative, a screen 24 comprised of a matrix array of liquid crystal display (LCD) elements is placed between light source 12 and negative 10. The light transmission through the LCD screen 24 is controllable by varying the light transmission through the LCD elements so that a pixel-by-pixel variation of light passage can be accomplished. In the pictured embodiment the LCD screen 24 is controlled by a computer processor 26. The processor is also coupled to the video camera 16 and is programmed to digitize the image from the camera and store it in memory in a matrix order. A suitable processor has been found to be an IBM PC-XT containing a PC-Vision Frame Grabber circuit board accessory sold by Imaging Technology, Inc. The PC-Vision circuit board matches the television resolution of 512×512 pixels in 8-bit gray scale per pixel. A matrix containing fewer elements would be suitable in most cases. A monitor 28 is coupled to the processor so that the image contained in the processor can be viewed by an operator. The processor also contains an operating program that allows the digitized image to be altered on a pixel-by-pixel basis by inputting through a keyboard, a mouse, a light pen, or some other input device. The altered image is then viewable on the monitor. The image from the processor is relayed to the LCD screen 24 to alter the screen and thereby the light transmission through the screen for the film negative 10. A suitable liquid crystal display matrix has been found to be an LCD array from a National (Panasonic) TR-3LT1 pocket television. If necessary, the image from the processor is fed through an RF modulator 23 to the LCD screen in order to obtain the proper video format. The National array has a 240×372 pixel resolution and a 14:1 attainable contrast ratio. The image from the processor controls the LCD matrix 24 to turn individual pixels on or off or to a desired transmission level, to allow transmission or blockage of light through the LCD in accordance with the image viewed on the monitor. In this manner, a pixel-by-pixel correction of the print density can be made by turning desired pixels on or off or to selected optical density in a selected manner to effect the transmission of light from the lamp through the negative.

The system shown in FIG. 1 is essentially a closed-loop system having a feedback loop between the TV camera and the LCD matrix to provide a real-time display of the image that will be produced by the negative. The real-time display allows the operator to view the results of his corrections concurrently with the time at which they are made. The LCD matrix image modification system shown in FIG. 1 includes two video output devices, namely the video monitor for operator interaction and the LCD screen for image modification. Each device has quite different types of information displayed, and since there is only one image output from the PC vision board at any one time, it would seem necessary to use a separate PC vision board for each video output device. While that is a possibility, it is possible to use only a single PC vision board, which amounts to a cost reduction for the system. The following is a brief description of how the matrix shutter system can be achieved with a single Frame Grabber image-digitizing board.

The key to using a single image-digitizing board is that only one video output device need be active at any one point in time. If the operator is interacting with the shutter program to modify the image, the LCD screen need not be active. If a print is being exposed, the LCD screen is active but the operator is not interacting with the program. Therefore, to use a single image-digitizing board and single memory, the system needs only to keep track of whether a print is being exposed or if the operator is interacting with the shutter system to alter the image. The processor software keeps a copy of both the LCD screen and monitor images in program memory and loads the appropriate image into the digitizing board memory as necessary. For user convenience, an additional video monitor 27 displaying the TV camera output may be used. The second monitor would display a replica of the negative, rather than the finally desired positive image, but video inverter 29 can be used to convert the image. Monitor 27 will then show the effect of corrections as they are made. As discussed above, the digitized image is stored and operated on by an operator through means of a keyboard or other input device or, alternatively, by a program that is formulated to control the density of the image according to certain criteria adjusting the density of any pixels that are greater or less than a desired density in accordance with a predetermined algorithm. The shutter 22 is kept closed during the image manipulation. Once the desired image is available on the monitor, the shutter 22 is opened, allowing the print to be made.

Figure 2:
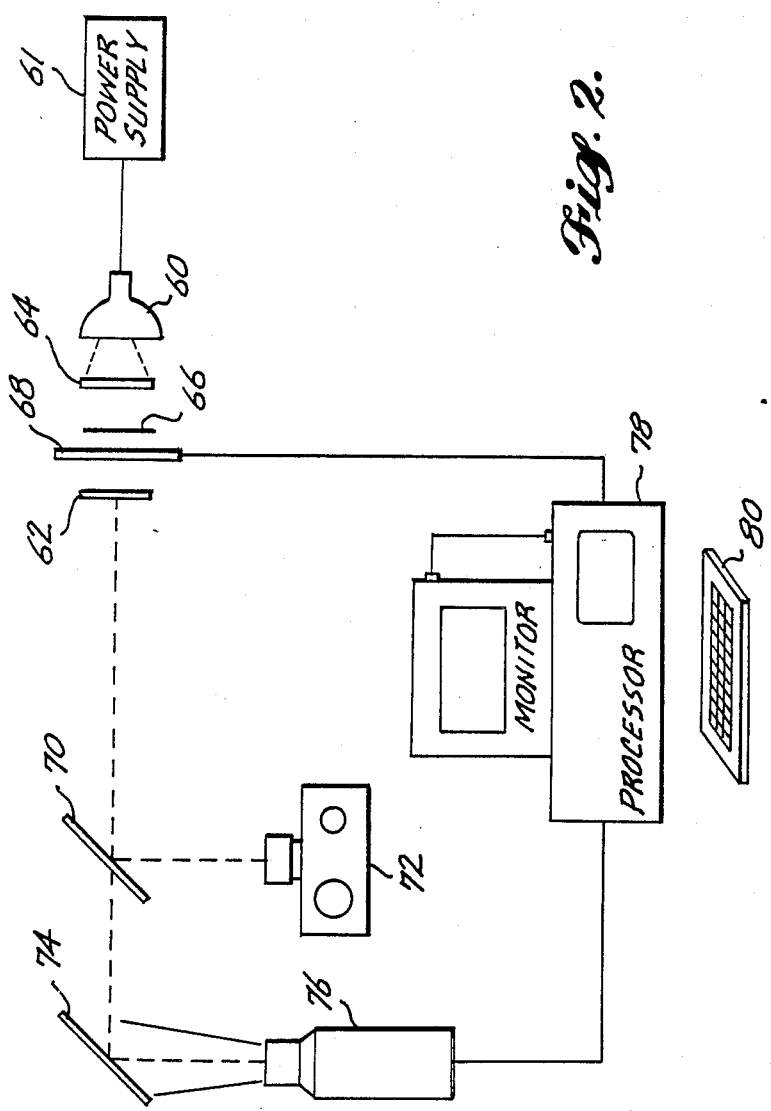
FIG. 2 is a block diagram showing the density correction apparatus of the present invention utilized in a system for producing an internegative for producing prints from slides or for producing an interpositive for producing multiple prints on an automatic printer.

It has been found that the local matrix density correction method of the present invention is also useful in making the internegatives used in producing photographic prints from photographic slides. The contrast range in a slide is on the order of 1000:1 while the contrast available in most photographic print paper is only on the order of 40:1. By using the method of the present invention, it is possible to compress the density range of the slide to more effectively be reproduced on paper of narrower density range. FIG. 2 shows a simplified setup for producing internegatives of photographic slides. A lamp 60 powered by power supply 61 is illuminated and provides light to illuminate a slide 62 in the optical path. An infrared remover 64 and a diffuser 66 are placed in the optical path to adjust the beam of light from the lamp in accordance with standard optical principles. An LCD matrix 68 is placed between the lamp and the slide, after the diffuser, and is used to modify the light beam from the lamp being projected onto the slide. The image from the slide is then focused on a beam splitter 70 that turns the image 90 degrees to the lens of a still camera 72 and also transmits the image to a mirror 74, which then turns the image 90 degrees to focus on a TV camera 76. The mirror 74 is used to make the image seen by the TV camera 76 congruent with that seen by the still camera 72. The TV camera then outputs its video signal to a processor 78 that is programmed to digitize the image and to operate upon the digitized image to adjust the density of those portions of the image that are above or below a threshold density in accordance, again, with a preselected algorithm. In addition, corrections can be made manually by an operator through keyboard 80 entries. The image from the processor is fed both to the LCD matrix 68 and to a video monitor 82 so that, again a real-time image of the altered slide image can be viewed by the operator. When the alteration to the slide image has been accomplished to the operator's satisfaction, the operator can operate the still camera 72 to produce a photograph of the slide image, which then can be used to make an internegative that can be printed to make one or more photographic prints derived from the slide 62.

In the previous examples, the LCD matrix has been typically used to modify the image used to produce density changes in black and white or color prints. When printing black and white photographs, different contrast papers can be used, from high to low contrast. Certain black and white photographic papers, such as that sold by Ilford Company under the trademark MULTIGRADE, have a variable-contrast property that is triggered by the exposure of the paper to different colors of light. For example, the use of blue light produces a contrast of one range and a use of green light produces a contrast of a different range. A selectively color-transmissive LCD array can be used in place of the array 24 in FIG. 1 to locally vary the color content and intensity of the negative image projected onto a black and white variable-contrast photosensitive paper. It is therefore possible to adjust on a local-area basis the contrast of the paper 96 in accordance with the needs of the operator to alter the contrast of the print produced from the negative.

Figure 3:
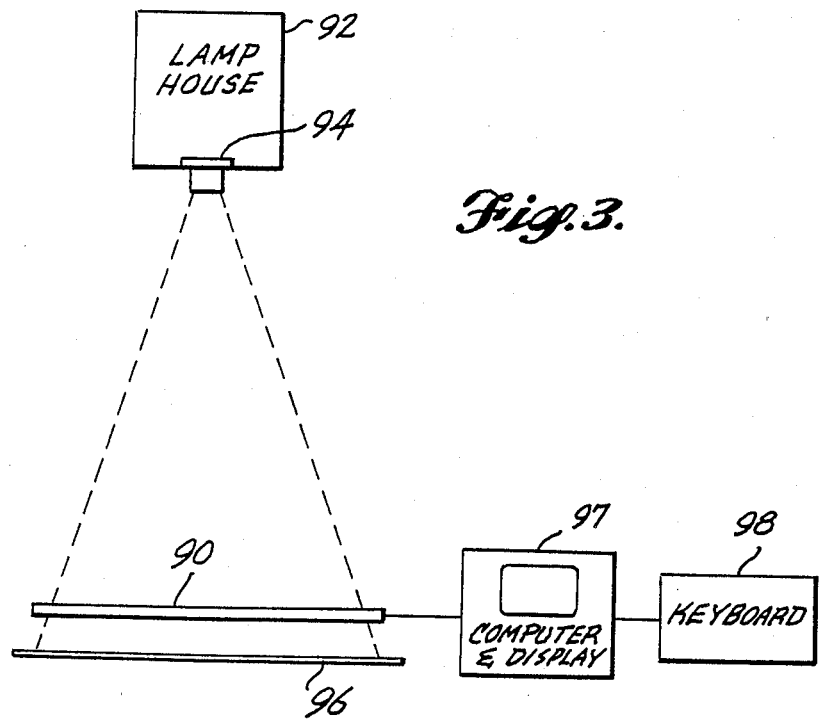
FIG. 3 is a schematic diagram of an apparatus in which a large-area liquid crystal display matrix is used to control, on a local-area basis, the contrast of a multiple-contrast photosensitive paper.
Figure 4:
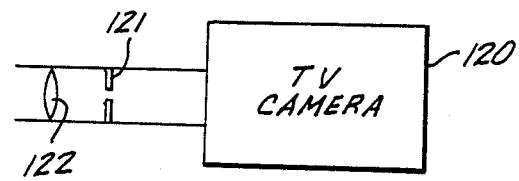
FIG. 4 is a schematic side view of a TV camera having a pin-hole lens.

FIG. 3 shows an alternative embodiment, involving a minimum of modification to an existing enlarger, that can be realized by placing an LCD array 90, which is essentially the same size as the finished print, at a predetermined distance above a photosensitive surface 96. A lamphouse 92 and negative holder 94 remain unmodified from the conventional enlarger apparatus. A computer and display 97 and a user input device, such as keyboard 98, are used, as in the previously discussed embodiments, to permit adjustment of the LCD array to achieve the desired color correction and contrast. In certain enlargers it may be necessary to place the TV camera effectively after the regular enlarger lens, so that lens modification to the enlarger is needed. FIG. 4 shows a conventional TV camera 120 and lens 122 with the addition of a pinhole aperture 121. The pinhole aperture 121 avoids the need to adjust the TV camera when small final focus adjustments are made to the enlarger lens.

Figure 5:
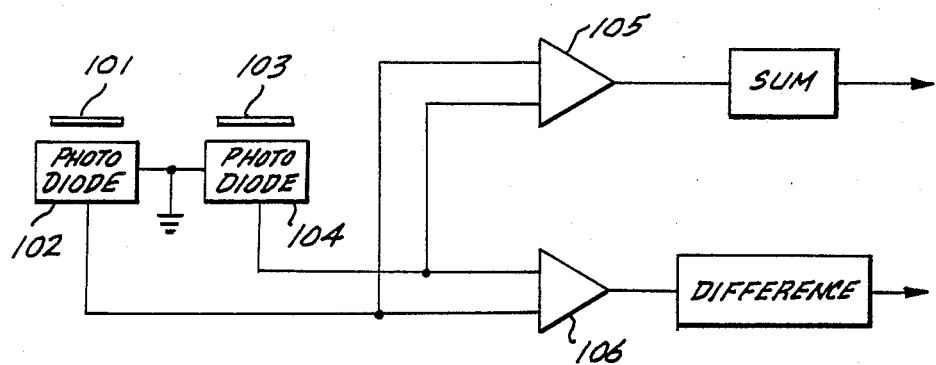
FIG. 5 is a schematic diagram of a color calibration system for use with the systems of FIGS. 1, 2, and 3.

A calibration reference is used to ensure that repeatable results are obtained even though changes in temperature, aging of components, dust buildup, or the like occur. One possible reference setup is shown in FIG. 5. For variable-contrast applications the calibrator uses filters 101 and 103 in combination with photodiodes 102 and 104 to measure the blue-to-green ratio using the outputs of both summing amplifier 105 and difference amplifier 106. For constant contrast situations, only the summed light level, i.e., the output of summing amplifier 105 is needed. By adding a red filter and an associated photodiode, the calibrator could be used in a color print system in which color balance, in addition to density and contrast, was adjusted. The outputs of the amplifiers 105 and 106 are connected to the processor 26 for use in adjusting the system components to achieve repeatable color balance. In certain cases, it may instead be practicable to use a high-stability TV camera (as in FIGS. 1 or 2) in conjunction with known filters as the calibration reference. The filters 101 and 103 are selectively placeable in the optical path of video camera 16 in FIG. 1 or video camera 76 in FIG. 2.

In summary, therefore, a system for selectively adjusting the density of a photographic print using a matrix of liquid crystal display elements is provided. The image from the negative is scanned by a television camera, which feeds the signal to a processor that digitizes the image and stores it as a matrix array. The digitized image is then operated on, either by operator input or through software control, to selectively modify any element of the matrix as necessary to achieve an appropriate density mask. The density mask formed by the LCD matrix array is placed between a light source and the negative to be printed, in order to adjust the light transmission through the negative to thereby produce an enhanced photographic print. A monitor is coupled to the processor to view the digitized image simultaneously with its output to the LCD matrix so that a real-time monitoring of the alterations to the negative image can be made. With appropriately responsive photographic papers and a color-selective LCD array, local contrast, as well as density variations, can be made on the print.

While a preferred embodiment of the invention has been described and illustrated herein, it should be clear to those of ordinary skill in the art and others that modifications can be made to the illustrated and described embodiments, while remaining within the spirit and scope of the present invention. For example, in the embodiment of FIG. 3, it is desirable to place the LCD matrix so that the image is out of focus with the paper 96 to prevent harsh contrast borders from area to area on the print. The image of the LCD can also be blurred by mechanically moving the LCD screen during printing such as by connecting a motor 124 to the LCD array 24 by means of an arm 125, or by electronically shifting the LCD image a few pixels back and forth. Also, the LCD screen can be placed on either side of the negative in the optical path. It is preferred to put the LCD screen ahead of the film negative in the optical path since aberrations of the LCD will have less effect there than if the LCD were placed between the film negative and the print paper. Since the TV camera will typically have its own lens system, it can be placed to view the image from the negative directly; however, the camera could also be placed to view the image after it passes through the lens system of the optical printer. Even when only density corrections are desired onto color print paper, the LCD device is preferably color selective and adjusted overall to maintain correct color balance. Since changes can be made to the illustrated and described embodiments, the invention should be defined solely with reference to the appended claims.

The embodiments of the invention in which an exclusive property or privilege is claimed are defined as follows:

1. In a photographic projection printer having a light source and a means for holding a film negative in the optical path of said light source to form an image from the negative on a photosensitive element also mounted in said printer, the improvement comprising:

a video camera positioned to view the image produced by the film negative and to produce a video signal representative of that image;

processor means coupled to said video camera for digitizing the video signal and storing the video signal in a matrix array;

control means coupled to said processor means and operable to selectively modify elements of said matrix array; and a matrix array of liquid crystal display elements interposed between the light source and said negative and coupled to said processor to receive said digitized video signal.

2. The system of claim 1, wherein said liquid crystal display matrix is a black and white transmissive television screen.

3. The system of claim 1, wherein said control means includes manual input means coupled to said processor for operation by an operator to manually modify the elements of said matrix array.

4. The system of claim 1, wherein said digitizing means and control means comprise a digital computer programmed to selectively modify the elements of said matrix array in accordance with a predetermined algorithm.

5. The system of claim 1, wherein said LCD matrix array is a color-transmissive television screen.

6. The system of claim 1, further including a beam splitter mounted between said negative and said photosensitive element to split the image from said negative into a first optical path and a second optical path, said video camera being in the first optical path and said photosensitive element being in the second optical path.

7. The system of claim 1, further including vibrating means connected to said matrix array operable to reciprocate said matrix array transversely to said optical path.

8. The system of claim 6, wherein said beam splitter is a red/infrared beam splitter.

9. The system of claim 1, wherein said video camera includes a pinhole lens in conjunction with the conventional lens.

10. The system of claim 5, further including an optical calibration means connectable to said processor means and said control means for providing reference signals to said processor means to adjust color ratios.

11. The system of claim 5, further including a set of known value optical filters selectively placeable in the path of the video camera for calibrating the color balance and intensity of the exposure of the printer.

12. A method for locally varying the contrast of a multiple-contrast photosensitive paper whose contrast range is dependent upon the color of light striking the photosensitive paper comprising the steps of:

interposing a matrix array of liquid crystal display elements in the optical path of the printer; and varying the color transmissivity of the matrix array element by element.

13. The method of claim 12, further including the step of locally varying the density of a photographic print by varying the overall light transmissivity of the matrix array element by element.

14. The method of claim 12, further including the step of physically reciprocating the matrix array in the plane of the array so as to minimize the visibility of any structural features of the array in the print.

15. An apparatus for locally varying the contrast of a multiple-contrast photosensitive paper whose contrast range is dependent upon the color of light striking the photosensitive paper comprising:

a holder for holding the photosensitive paper;

a light source;

means for mounting a negative in the path of light from the light source;

a lens system positioned to project an image from said negative on said paper;

a matrix array of liquid crystal display elements positioned in the optical path from said light source to said paper; and control means connected to said matrix for varying the color transmissivity of said liquid crystal display elements on an element-by-element basis.

16. The apparatus of claim 16, further including means for reciprocating said matrix in a plane transverse to said optical path.

17. The apparatus of claim 15, wherein said matrix array is adjacent said paper and of a size substantially the same as the print to be produced.

* * * * *